United States Patent [19]

DoCarmo

[11] Patent Number: 4,986,003

[45] Date of Patent: Jan. 22, 1991

[54] CALIBRATION TOOL

[75] Inventor: Chris DoCarmo, Springfield, Mass.

[73] Assignee: United Technologies Corporation, Hartford, Conn.

[21] Appl. No.: 445,258

[22] Filed: Dec. 4, 1989

[51] Int. Cl.$^5$ .............................................. G01B 3/30
[52] U.S. Cl. ........................................ 33/502; 33/536; 33/626; 33/645
[58] Field of Search .................. 33/502, 534–538, 33/481, 567.1, 626, 638, 645

[56] References Cited

U.S. PATENT DOCUMENTS 3,166,853  1/1965  Marcus .............................. 33/538 X
4,389,785  6/1983  Goldsmith ............................ 33/536

FOREIGN PATENT DOCUMENTS 792869  4/1958  United Kingdom ................. 33/535

OTHER PUBLICATIONS

Science & Mechanics–"Universal Right Angle Irons", 6/45, pp. 113–114.

Primary Examiner—Harry N. Haroian
Attorney, Agent, or Firm—Lloyd D. Doigan

[57] ABSTRACT

A method and apparatus for calibrating a jig bore is provided. An angle iron is provided having a sine bar and a portion, which is disposed at an acute angle to a plane parallel to an x-y axis, disposed integrally thereon. The angle iron is designed to calibrate the jig bore with a minimum of time and set-ups.

2 Claims, 1 Drawing Sheet

CALIBRATION TOOL

TECHNICAL FIELD

This invention relates to a method and apparatus for calibrating a boring machine having a tiltable jig mounted thereon.

BACKGROUND ART

Jig boring machines consist of a reciprocating boring tool and a table. The table, which typically moves in an x-y plane, holds a workpiece for drilling by the bore, which translates in parallel to a z-axis. The table may hold a jig for maintaining a particular mechanical relationship between the workpiece and the bore. Some jigs may rotate the workpiece in the x-y plane or tilt the workpiece about the x or y-axis In order to ensure the accuracy of the boring, the support table, the bore, and the jig must be calibrated.

It is known in the art to utilize an angle iron to calibrate a jig boring machine. The angle iron consists of three rectangular, dimensionally stable, flat plates. The first plate is disposed in parallel to the x-y plane, and has an edge disposed in parallel to the x-axis and an edge disposed in parallel to the y-axis. The second plate attaches at a bottom edge portion thereof to an edge of the first plate, and is disposed in parallel to a y-z plane. The second plate has an edge portion disposed in parallel to the y-axis and an edge portion disposed in parallel to the z-axis. The third plate is disposed in parallel to an x-z plane and attaches at a bottom edge thereof to a top surface of the first plate and at a side edge thereof to the second plate. The third plate has an edge portion disposed in parallel to the x-axis and an edge portion disposed in parallel to the z-axis. The third plate has an opening which functions as a handle.

To calibrate the jig boring machine, essentially two items must be checked—the jig boring machine and the jig. By attaching a dial indicating gage (i.e. a surface gage) to the bore, and mounting the angle iron to the jig, the jig boring machine may be calibrated by moving either the support table or the bore as explained below.

By placing the dial indicating gage upon the surface of the table and translating the table in parallel to the x-axis, the tilt of the table relative to the y-axis may be checked. Similarly, by placing the dial indicating gage upon the surface of the table and translating the table in parallel to the y-axis, the tilt of the table relative to the x-axis may be checked.

By placing the dial indicating gage along an edge of the first plate arranged to be in parallel to the x-axis and translating the table in parallel to the x-axis, the tilt of the jig relative to the x-axis may be calibrated. By placing the dial indicating gage along a surface of the second plate arranged to be in parallel to the x-z plane and translating the bore along that surface in the z-axis, a first component of the alignment of the bore to the z-axis may be checked.

Similarly, by placing the dial indicating gage along an edge of the first plate arranged to be in parallel to the y-axis and translating the table in parallel to the y-axis, the tilt of the jig relative to the y-axis may be calibrated. By placing the dial indicating gage along a surface of the second plate arranged to be in parallel to the y-z plane and translating the bore along the surface in the z-axis, a second component of the alignment of the bore to the z-axis may be checked.

When using a jig which tilts about the x or y-axis, the accuracy of the angle of tilt must be calibrated. Typically, the jig is tilted a given degree and a sine bar or plate is mounted on the jig after the angle iron is removed.

The sine bar or plate is utilized for accurately measuring angles or for locating work to a given angle. Two buttons of the same diameter and at a known distance apart are mounted on a center line. The sine bar rotates about one button. The operation of the sine bar is based on the trigonometric relationship that the sine of an angle is equal to the opposite side divided by the hypotenuse. Hence, if the hypotenuse is known, the angle may be determined by measuring the height of the opposite side, dividing it by the known figure, and referring to trigonometric tables. Measurement of the unknown side is accomplished by the use of a height gage or precision blocks. The tilt of the table may be calibrated by subtracting the given angle from 90°, adding the proper precision blocks to one end of the sine bar so the the sine bar (i.e. the hypotenuse) is disposed at the subtracted angle (if properly calibrated, the sine bar would be parallel to the x-y plane), placing the dial indicating gage along the sine bar, and translating the support table parallel to the x-axis.

The present method is time consuming and requires a plurality of set-ups. Hence, a new calibration tool is sought.

DISCLOSURE OF INVENTION

It is an object of the invention to minimize the time necessary to calibrate a jig bore.

It is a further object of the invention to minimize the number of set-ups required to calibrate a jig bore.

According to the invention, an angle iron is provided having a sine bar and a portion, which is disposed at an acute angle to a plane parallel to an x-y axis, disposed integrally thereon, the angle iron being designed to calibrate a jig bore with a minimum of time and set-ups. The angle iron comprises a dimensionally stable first plate disposed in parallel to an x-y plane, a dimensionally stable second plate attaching at one end to the first plate, the second plate being disposed in parallel to a y-z plane, and a dimensionally stable third plate, the third plate having a first surface attaching to the first plate, a second surface extending at right angles from the first plate and attaching to the second plate, a third surface disposed in parallel to the first surface and extending at right angles from the second surface, a fourth surface extending at right angles from said first surface and in parallel to said second surface, and a fifth surface connecting said third and fourth surfaces at a given calibration angle to the first and second plates, the third plate being disposed in parallel to an x-z plane. The first plate may have a sine bar rotatably mounted thereon.

According further to the invention, a method of calibrating a jig bore utilizing the angle iron, is provided as follows; mounting a dial indicating gage within a bore of the jig bore, tilting a jig about the y-axis to a given calibration angle, placing the dial indicating gage against the fifth surface of the third plate, and translating the jig in parallel to the x-axis. When utilizing the sine bar for angles other than the given calibration angle, the following steps are added; subtracting a desired calibration angle from 90° to obtain a subtracted angle, setting the sine bar at the subtracted angle, placing the dial indicating gage against the sine bar, and translating the jig in parallel to the x-axis.

These and other objects, features, and advantages of the present invention will become more apparent in light of the detailed description of the best mode embodiment thereof, as illustrated in the accompanying drawing.

BEST MODE FOR CARRYING OUT THE INVENTION

Figure 1:
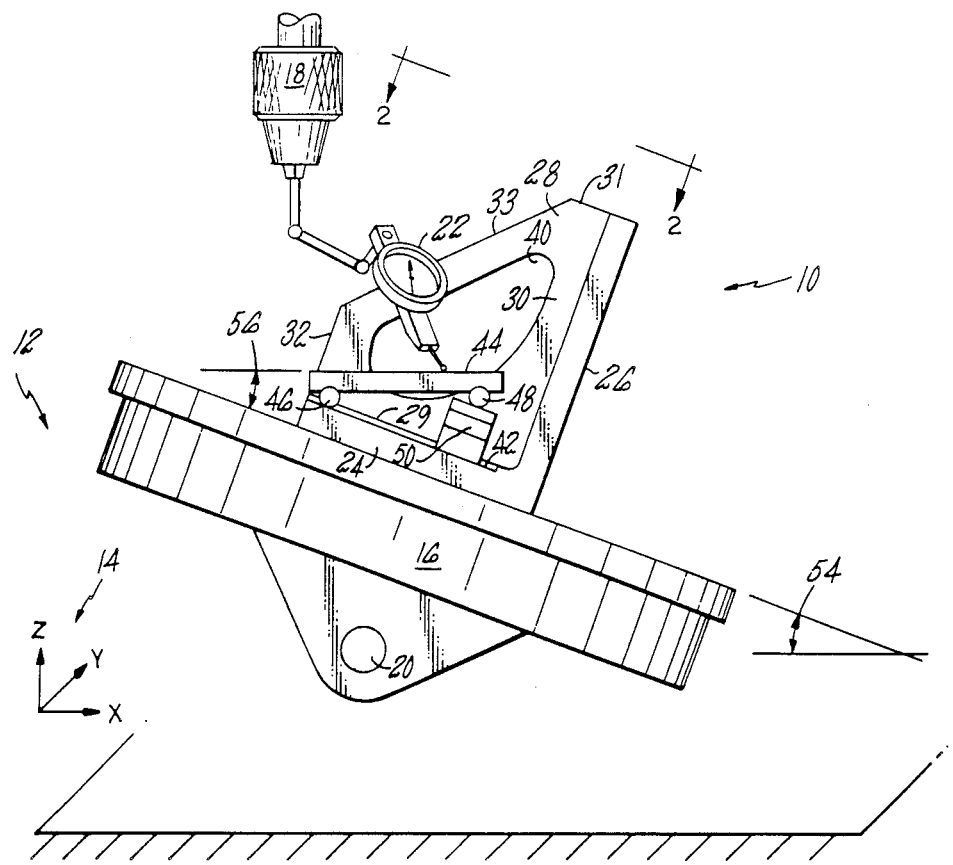
FIG. 1 is a plan view of an angle iron of the invention set up upon a representation of a jig bore.
Figure 2:
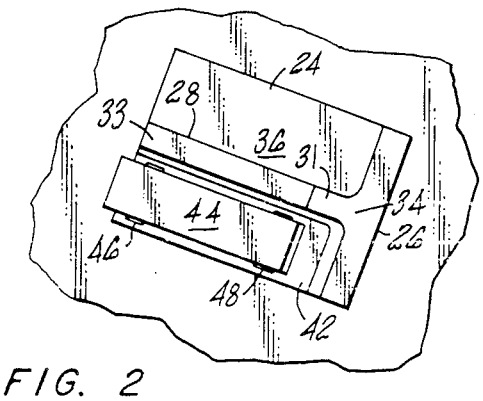
FIG. 2 is a view of the angle iron of FIG. 1, taken along the line 2—2.

Referring to FIG. 1, an angle iron 10 of the present invention is shown in conjunction with a representation of a jig bore 12. For reference purposes, x, y, and z axes 14 are defined as follows; the x-axis is disposed along the abscissa, the z-axis is disposed along the ordinate, and the y-axis, while shown in perspective, is perpendicular to the x-axis and the z-axis The jig bore is comprised of a jig 16, a bore 18, and a table (not shown) to which the jig is rotatably mounted about pivot 20. A dial indicating gage 22 is mounted to the bore for calibration purposes as will be discussed infra. It is understood that the table (and hence the jig) translates in parallel to the x-y plane.

The angle iron 10 consists of three, dimensionally stable, flat plates. The first plate 24 is rectangular and is disposed in parallel to the x-y plane. The second plate 26 is rectangular and attaches at a right angle to the first plate. The second plate is disposed in parallel to a y-z plane. The third plate 28 has a first surface 29 attaching to the first plate, a second surface 30 disposed at right angles to the first surface and attaching to the second plate, a third surface 31 disposed at right angles to the second surface and in parallel to the first surface, a fourth surface 32 disposed at right angles to the first surface and in parallel to the second surface, and a fifth surface 33 connecting the third and fourth surfaces. The fifth surface 33 of the third plate is disposed at a 45° angle (a common calibration angle) to the first and second surfaces. The first surface 29 and the second surface 30 intersect at right angles to a center portion 34 of the first plate and a center portion 36 of the second plate. The third plate is disposed in parallel to the x-z plane. The third plate has an opening 40 which functions as a handle.

Attaching to an upper surface 42 of the first plate 24 is a sine bar 44. The sine bar has a first button 46 and second button 48 of the same diameter mounted thereto. The sine bar rotates about the first button which is pivotably mounted to the first plate. The second button rests upon precision blocks 50 which are used to rotate the sine bar about the first button to a given angle.

The jig 16 tilts about the y-axis via the pivot 20. The accuracy of the angle of tilt must be calibrated. The jig is tilted to a given degree 54. If the given degree 54 is to be equal to 45°, the accuracy of the tilt may be determined by placing the dial indicating gage against the fifth surface 33 of the third plate and translating the jig along the fifth surface parallel to the x-axis. If the given angle is other than 45°, the sine bar 44 is used.

The tilt of the table may be calibrated by subtracting the given angle 54 from 90, adding the proper precision blocks 50 under the second button 48 so that the sine bar (i.e. the hypotenuse) is disposed at the subtracted angle 56 (if properly calibrated, the sine bar would be parallel to the x-y plane), placing the dial indicating gage 22 along the sine bar, and translating the jig along the sine bar parallel to the x-axis.

By mounting the sine bar to the first plate, a set-up is eliminated. By disposing the fifth surface of the third plate at a common angle, the use of the sine bar and another set-up may be eliminated altogether.

Although this invention has been shown and described with respect to detailed embodiments thereof, it will be understood by those skilled in the art that various changes in form and detail thereof may be made without departing from the spirit and scope of the claimed invention. In particular, if a tiltable jig is used which is commonly calibrated to an angle other than 45°, the angle of the third plate relative to the first and second plates may be set at that angle.

We claim:

1. Method of calibrating a jig bore having a bore, a tiltable jig, and a support table having said jig mounted thereon, said bore translating in parallel to a z-axis, said table being in parallel to an x-y plane, said method comprising the steps of:

mounting an apparatus for calibrating a tiltable jig bore upon said said apparatus having;

a dimensionally stable first plate disposed in parallel to said x-y plane, a dimensionally stable second plate attaching at one end thereof to said first plate, said second plate being disposed in parallel to a y-z plane, and a dimensionally stable third plate, said third plate having a first surface attaching to said first plate, having a second surface attaching to said second plate, and having a third surface disposed at a given calibration angle to said first and second plates, said third plate being disposed in parallel to an x-z plane, mounting a surface gage within said bore, tilting said tiltable jig to said given calibration angle placing the surface gage upon said third surface, and translating said table such that said surface gage travels along said third surface.

2. Method of calibrating a jig bore having a bore, a tiltable jig, and a support table having said jig mounted thereon, said bore translating in parallel to a z-axis, said table being disposed in parallel to an x-y plane, said method comprising the steps of:

mounting an apparatus for calibrating a tiltable jig bore upon said jig, said apparatus having;

a dimensionally stable first plate disposed in parallel to said x-y plane, a dimensionally stable second plate attaching at one end thereof to said first plate, said second plate being disposed in parallel to a y-z plane, a dimensionally stable third plate, said third plate having a first surface attaching to said first plate, having a second surface attaching to said second plate, and having a third surface disposed at a given calibration angle to said first and second plates, said third plate being disposed in parallel to an x-z plane, and a sine bar pivotably attaching to an upper surface of said first plate, mounting a surface gage within said bore, tilting the jig to said given calibration angle, subtracting said calibration angle from 90° to obtain a subtracted angle, setting said sine bar at said subtracted angle, placing the surface gage upon said sine bar, and translating said table such that said surface gage travels along said sine bar.

* * * * *

UNITED STATES PATENT AND TRADEMARK OFFICE
CERTIFICATE OF CORRECTION

PATENT NO. : 4,986,003

DATED : January 22, 1991

INVENTOR(S) : Chris DoCarmo

It is certified that error appears in the above-identified patent and that said Letters Patent is hereby corrected as shown below:

Column 4:
Claim 1, line 23, after "said" (first occurrence) insert
--table--.

Signed and Sealed this

Thirtieth Day of June, 1992

*Attest:*

DOUGLAS B. COMER

*Attesting Officer*   *Acting Commissioner of Patents and Trademarks*